UNITED STATES PATENT OFFICE.

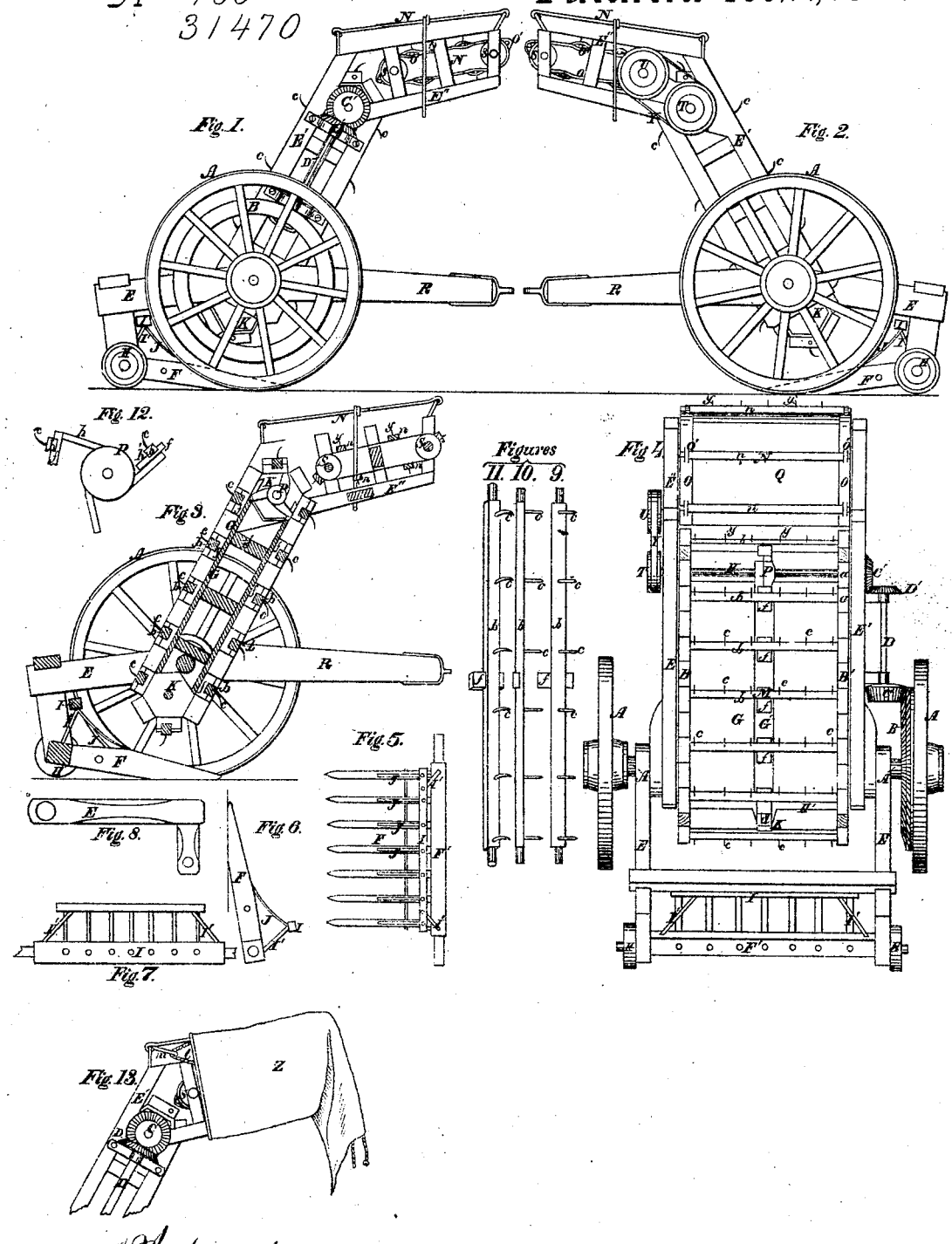

JOHN B. McINTOSH, OF GIRARD, PENNSYLVANIA.

IMPROVEMENT IN MACHINES FOR LOADING HAY.

Specification forming part of Letters Patent No. 31,470, dated February 19, 1861.

*To all whom it may concern:*

Be it known that I, JOHN B. MCINTOSH, of Girard, in the county of Erie and State of Pennsylvania, have invented certain new and useful Improvements in a Machine for Loading Hay; and I do hereby declare that the following is a full and complete description of the construction and operation of the same, reference being had to the accompanying drawings, making a part of this specification, in which—

Figures 1 and 2 are side elevations. Fig. 3 is a vertical section. Fig. 4 is a view of the top. The remaining figures represent detached sections.

Like letters refer to like parts in the different views.

My improvement relates to a machine for loading hay, connected to the rear end of the wagon, moving along on wheels with the wagon, having a rake on the under side gathering up the hay that is conveyed up by carriers, operated by endless belts through a hood onto the wagon.

A in Figs. 1, 2, 3, and 4 represents two wheels, which are of the form and size of ordinary wagon-wheels. On the inside of one of these wheels is the gear-wheel B, that revolves with the wheels A, turning the gears C and D', connected by the shaft D, revolving the gear C', by means of which the carriers M and N are operated.

E in the several figures represents the ends of the frame, that support and connect the rake F with the shaft A'. (Shown in Fig. 4.) The same detached is represented by Fig. 8. On the ends of the head-piece F', Fig. 5, of the rake are small wheels H, (shown in Figs. 1, 2, 3, and 4,) which revolve on the ground keeping the head of the rake sufficiently elevated, while the front rests on the ground, for the purpose of gathering up all the hay. I is a piece supported above the rake by a brace, I', at each end, for the purpose of having bent rods J connected with the teeth of the rake, as shown in Fig. 6, to support and guide the hay upon the carrier. The form and arrangement of this rake are admirably adapted to the purpose for which it is designed.

E is an inclined frame, connected to the shaft A', that supports the carrier M, in the upper and lower parts of which are shafts H and H'. On the ends of these shafts, inside of the frame, are hexagonal pulleys K, (shown in Fig. 3,) which revolve the endless chains or belts B'. These chains are made of leather belting, with pieces of wood or any other suitable material attached to it, of uniform size, corresponding with the sides of the pulley.

*b* in Figs. 3 and 4, also 9, 10, and 11, represents the tooth-bars extending between and secured to the chains which form the carrier M, having curved teeth or fingers *c c*, &c., on the outside.

G is an inclined table, secured to the frame of the machine, that prevents the hay from falling through. In the center of this table is the guide G', the lower end of which is pointed and fits in a slot, *d*, Fig. 4, in the pulley K' on the center of the lower shaft, H', which forms a kind of a belt for the pieces *f* on the under side of the tooth-bars to move on. These pieces, moving on the guide G', also support the bars in the right place and prevent the weight of the hay from turning them over. On the center of the upper shaft, H, is a cam, P. (Shown in Figs. 3 and 4.) An enlarged view of the same, with the position of the tooth-bars, is shown in Fig. 12. The piece *f* under the tooth-bar passes off the end of the guide G' onto the end of the arm *h* of the cam, and as they revolve the pressure of the hay, as it comes in contact with the carrier N, forces the tooth-bar gradually down on the side of the arm until it is in the position shown at *h'*, Fig. 12, which causes the hay all to pass off on the other carrier, leaving none to be carried under and fall on the ground. The connection of the tooth-bar with the chains B' as they revolve cause it to turn over on the end of the arm *h* and pass onto a guide, G'', on the under side of the frame, similar to G'.

E'' is the portion of the frame that supports the carrier N, joined to the frame E'. S, Figs. 1, 2, and 3, are rollers on which are leather belts O. The two opposite ones are connected by shafts on which revolves the endless apron Q.

*n n* are toothed bars, the ends of which are fixed in the leather belts, as shown at O'. They are also attached to the endless apron, which in this way is made to move with them. The teeth *y* in these bars are different from those in the other carrier, being short and straight. This carrier is operated by means of the pulley T, Fig. 2, which is on the opposite end of the shaft from the gear C', Fig. 1, turning the pulley U by means of the belt Y, the pulley U being on the end of one of the shafts of the upper carrier.

On the carrier N is arranged a wire frame, N', on which is placed a hood or covering of cloth, as shown at Z in Fig. 13, to prevent the hay from falling or blowing away as it falls from the machine onto the wagon. This hood should be longer than the frame, so as to reach the whole length of the wagon. It can be shortened and drawn up on the frame by the man on the load pulling the cords l, that pass through the slides m on the frame and are secured to the front of the hood.

In practical operation the machine is connected to the rear end of the wagon by the tongue R. If the hay is raked in windrows, the team and wagon are driven astride the rows, the rake gathering up the hay rapidly, which is conveyed up on the carriers, as before described, and is poured out of the hood onto the wagon, loading it in the least possible time.

It is not necessary that the hay should be raked before loading, for the machine as it moves along will rake up all the hay; but the wagon will not be loaded as rapidly as when it is raked in windrows.

What I claim as my improvement, and desire to secure by Letters Patent, is—

1. The employment of the cam P, constructed and operating as described, in combination with the tooth-bars b, to discharge the hay onto the endless apron O, in the manner and for the purpose specified.

2. The arrangement of the frame N' with the adjustable hood Z, in combination with carrier N and endless apron O, in the manner and for the purposes specified.

JOHN B. McINTOSH.

Witnesses:
I. NEWTON MILLER,
WM. CROSS.